(12) United States Patent
Olczak

(10) Patent No.: US 7,511,804 B1
(45) Date of Patent: Mar. 31, 2009

(54) CROSSED BEAM ROOF TARGET FOR MOTION TRACKING

(75) Inventor: Eugene Olczak, Pittsford, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 12 days.

(21) Appl. No.: 11/786,262

(22) Filed: Apr. 10, 2007

(51) Int. Cl.
G01B 11/26 (2006.01)
(52) U.S. Cl. ............... 356/139.03; 356/139.01; 356/139.02; 356/139.1
(58) Field of Classification Search ............ 356/139.03
See application file for complete search history.

(56) References Cited

U.S. PATENT DOCUMENTS

| | | | |
|---|---|---|---|
| 5,552,883 A * | 9/1996 | Busch-Vishniac et al. | 356/139.03 |
| 6,483,106 B1 * | 11/2002 | Ohtomo et al. | 250/236 |
| 6,556,283 B2 * | 4/2003 | Shirai et al. | 356/5.01 |
| 2004/0257658 A1 * | 12/2004 | Van Gorkom | 359/614 |

* cited by examiner

Primary Examiner—Thomas H. Tarcza
Assistant Examiner—Luke D Ratcliffe
(74) Attorney, Agent, or Firm—Ratner Prestia

(57) ABSTRACT

A system for detecting motion between a first body and a second body includes first and second detector-emitter pairs, disposed on the first body, and configured to transmit and receive first and second optical beams, respectively. At least a first optical rotator is disposed on the second body and configured to receive and reflect at least one of the first and second optical beams. First and second detectors of the detector-emitter pairs are configured to detect the first and second optical beams, respectively. Each of the first and second detectors is configured to detect motion between the first and second bodies in multiple degrees of freedom (DOFs). The first optical rotator includes a V-notch oriented to form an apex of an isosceles triangle with respect to a base of the isosceles triangle formed by the first and second detector-emitter pairs. The V-notch is configured to receive the first optical beam and reflect the first optical beam to both the first and second detectors. The V-notch is also configured to receive the second optical beam and reflect the second optical beam to both the first and second detectors.

17 Claims, 9 Drawing Sheets

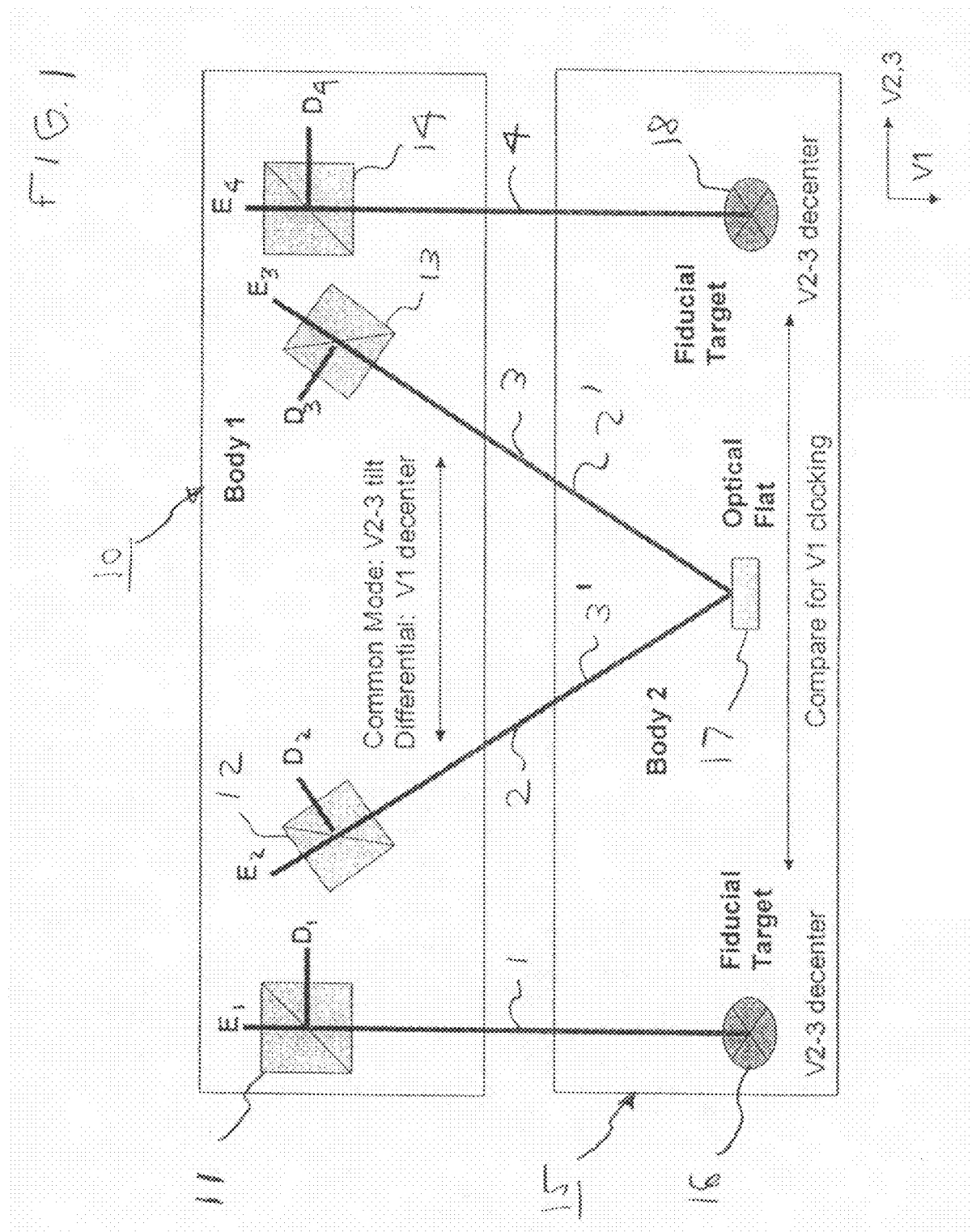

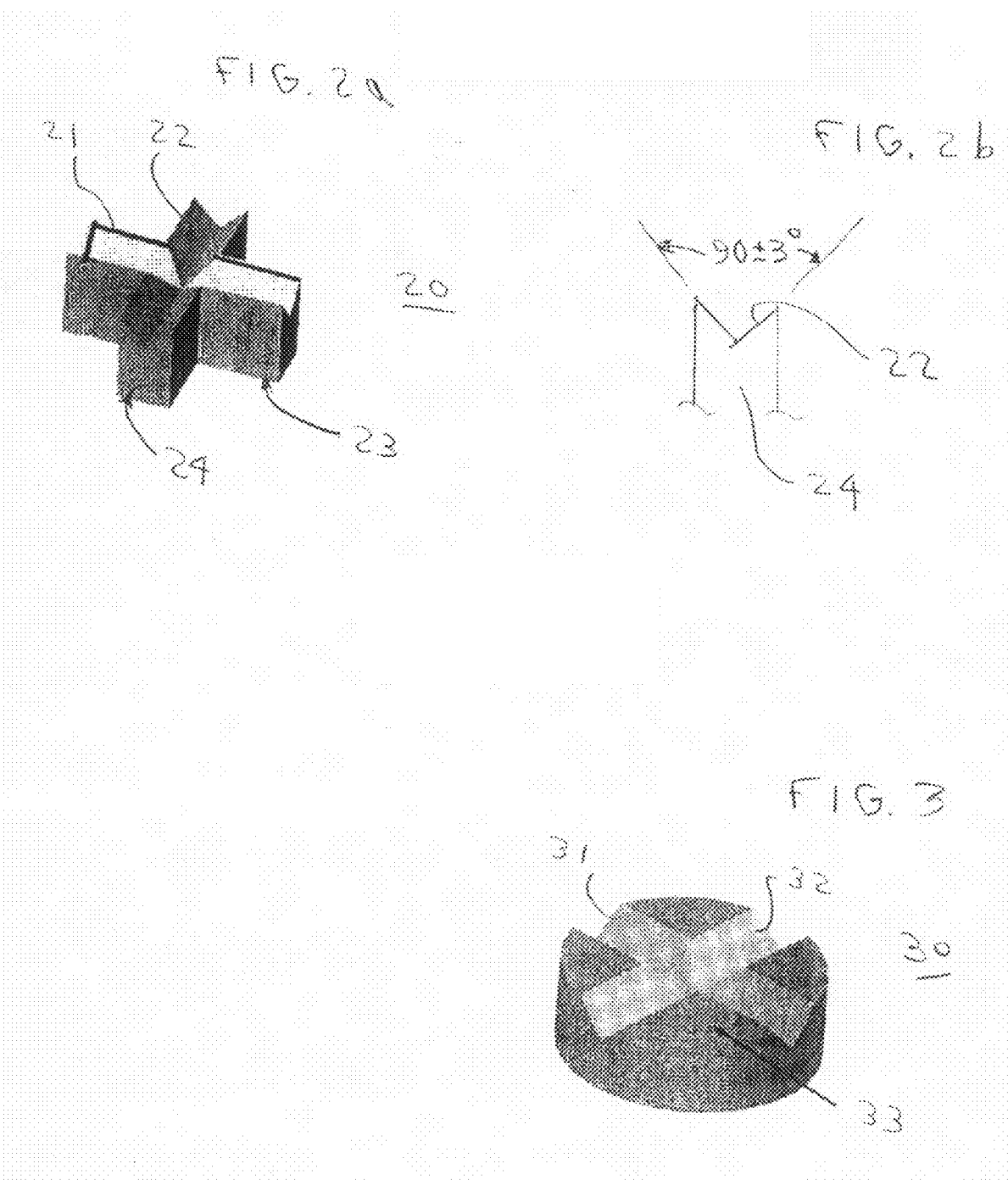

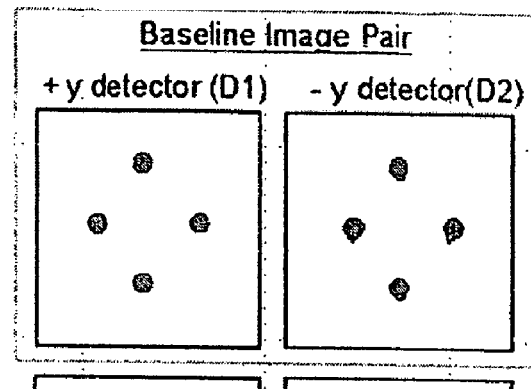
FIG. 6a
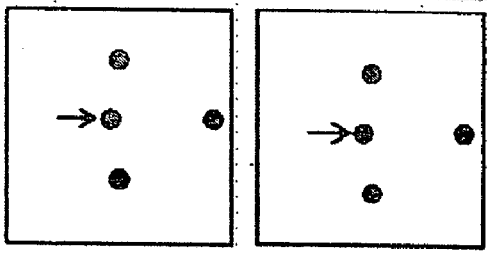
FIG. 6b
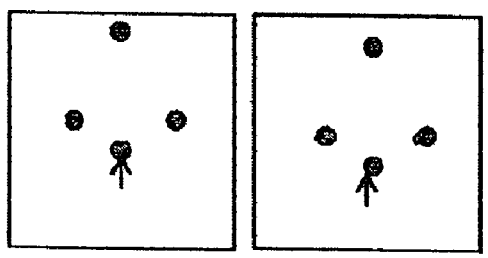
FIG. 6c
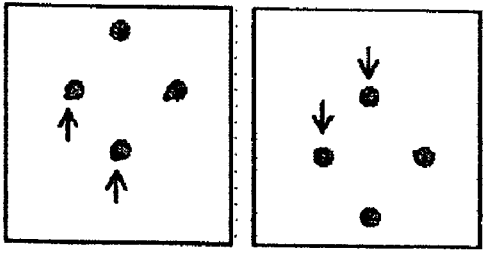
FIG. 6d
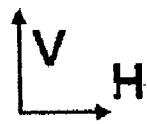

FIG. 7a
FIG. 7b
FIG. 7c
FIG. 7d
FIG. 7e
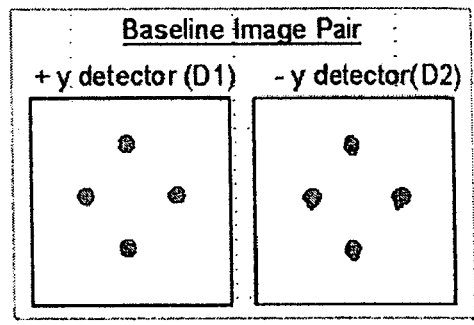
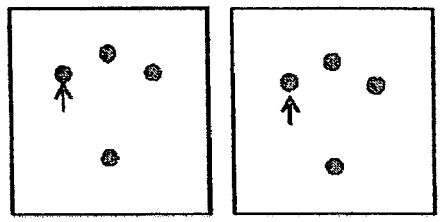
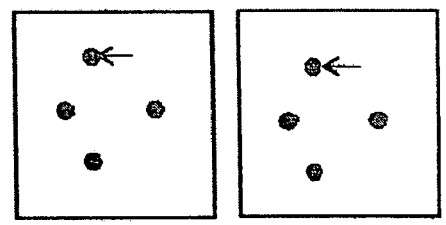
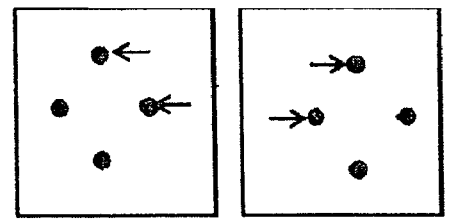
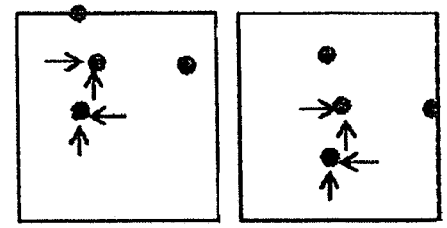
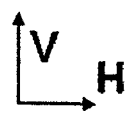

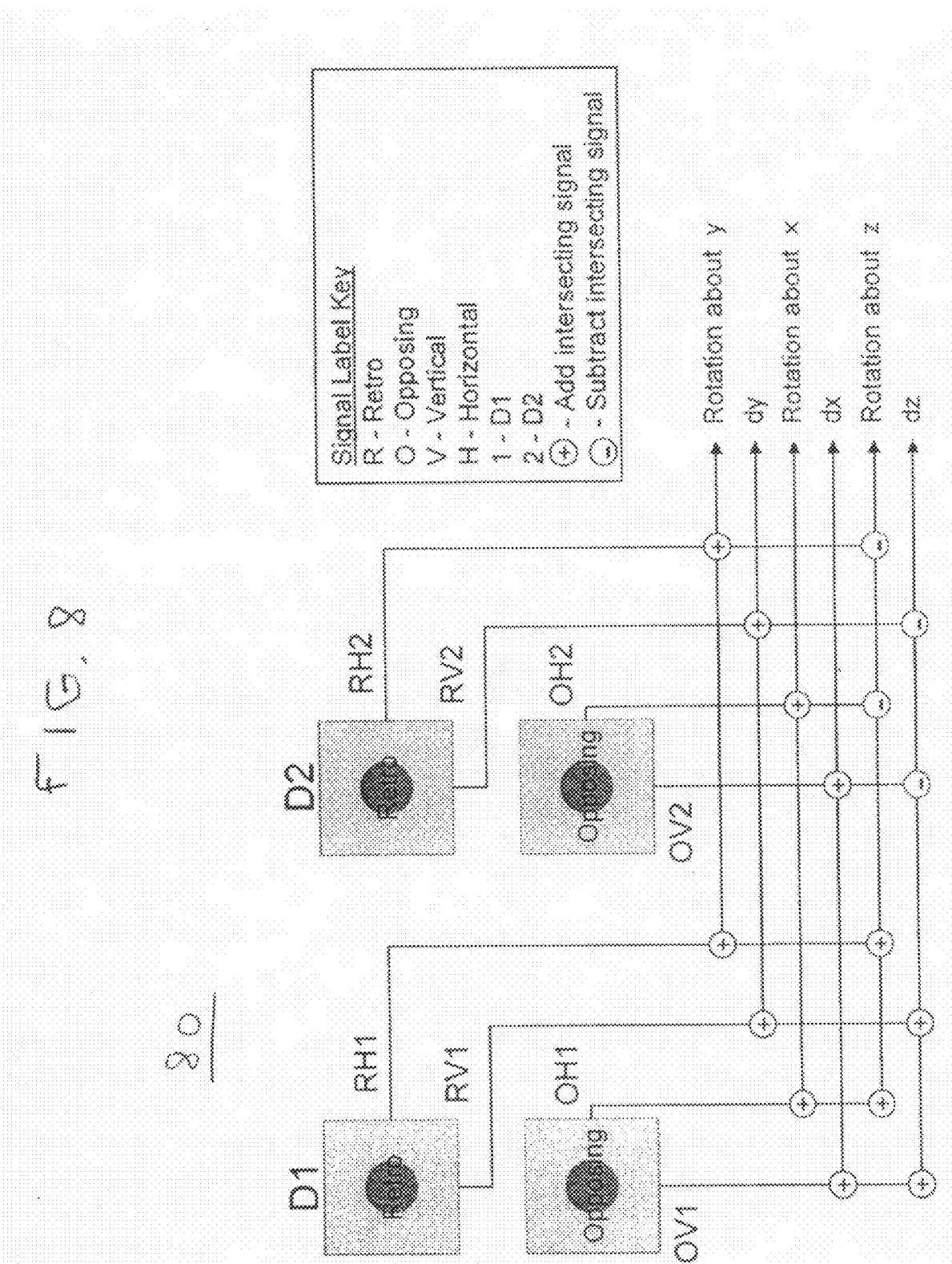

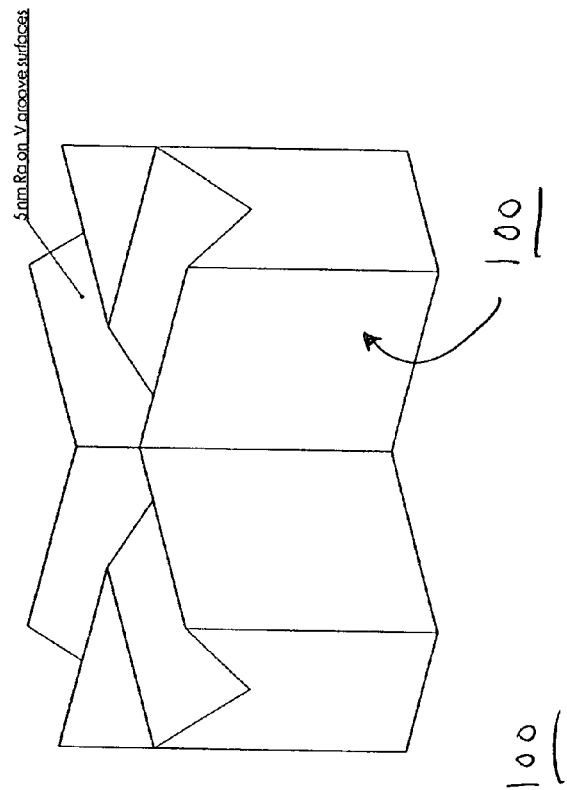
FIG. 10a
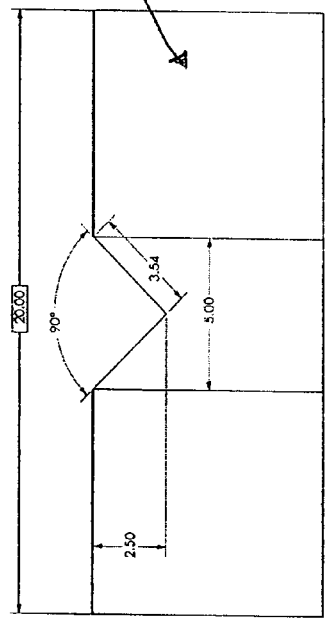
FIG. 10b
FIG. 10c

US 7,511,804 B1

CROSSED BEAM ROOF TARGET FOR MOTION TRACKING

STATEMENT REGARDING FEDERALLY SPONSORED RESEARCH

The invention described herein was made in the performance of work under NASA Contract No. NAS5-02200 and is subject to the provisions of Section 305 of the National Aeronautics and Space Act of 1958 (42 U.S.C. 2457).

TECHNICAL FIELD

The present invention relates, in general, to a system and method of tracking motion between one body and another body. More specifically, the present invention relates to a system and method of measuring displacement and orientation in six spatial degrees of freedom (DOF) between two separate bodies.

BACKGROUND OF THE INVENTION

There are many applications in optics and other fields where it is desirable to provide alignment information or relative motion tracking information in all six spatial degrees of freedom (DOF) for one or more locations on a body. In such case, there are a variety of metrology options to measure the displacement and orientation of the locations of interest. These options include isolated contact probes (such as feeler gauges, and linear voltage differential transform gauges), holography, auto-collimators, interferometers, capacitance distance measuring interferometers, laser tracking systems, etc.

The measurement is more challenging, when it must be done with limited access to locations on a body of interest. For example, in situ testing on a factory floor or integration of components is typically a situation in which access to a body or a component is limited. Under such condition, use of a coordinate measurement machine (CMM) where a body is entirely surrounded or scanned by a calibrated contact or non-contact probe is not feasible or practical.

In addition, it is difficult to measure relative motion between large bodies in a confined space with little real estate available for metrology components. Measurement of relative motion is even more difficult, if not impossible, when knowledge of motion in six degrees of freedom (DOF) is necessary.

The present invention addresses the above problems by providing a system and method for measuring displacement and orientation in six spatial DOF between two separate bodies.

SUMMARY OF THE INVENTION

To meet this and other needs, and in view of its purposes, the present invention provides a system for detecting motion between a first body and a second body. The system includes first and second detector-emitter pairs, disposed on the first body, that are configured to transmit and receive first and second optical beams, respectively. At least a first optical rotator is disposed on the second body and configured to receive and reflect at least one of the first and second optical beams from the first and second detector-emitter pairs. First and second detectors are configured to detect the first and second optical beams, respectively. Each of the first and second detectors is configured to detect motion between the first and second bodies in multiple degrees of freedom (DOFs).

Each of the first and second emitters may be configured to transmit the first and second optical beams toward first and second beam splitter cubes, respectively. The first optical rotator includes a V-notch oriented to form an apex of an isosceles triangle with respect to a base of the isosceles triangle formed by the first and second beam splitter cubes. The V-notch is configured to receive the first optical beam from the first splitter cube and reflect the first optical beam to both the first and second splitter cubes; and the V-notch is configured to receive the second optical beam from the second splitter cube and reflect the second optical beam to both the first and second splitter cubes. The V-notch forms an angle of 90 degrees + or −3 degrees.

The system may include a second optical rotator, disposed on the second body. As a result, the first and second optical rotators form first and second V-notches, respectively, which are transversely oriented to each other and form a crossed beam target. A length of the first V-notch is oriented perpendicular to an incidence plane of the first and second optical beams and a length of the second V-notch is oriented parallel to the first and second optical beams.

Another embodiment of the present invention includes a system for detecting motion between a first body and a second body. The system includes a target having two orthogonally oriented grooves crossing each other, wherein each groove is configured as a V along a cross-section of the target, and the target is disposed on the first body; at least one beam splitter cube may be disposed on the second body; at least one emitter configured to transmit an optical beam toward the target by way of the one beam splitter cube; and at least one detector configured to receive a portion of the optical beam reflected from the target by way of the one beam splitter cube. The one detector is configured to detect motion between the first and second bodies. The target includes two orthogonally oriented beams crossing each other, and each beam includes one of the two orthogonally oriented grooves. In addition, two beam splitter cubes may be disposed on the second body. Two emitters are configured to each transmit a respective optical beam toward the target by way of a respective beam splitter cube. Two detectors are configured to each receive a portion of the respective optical beam reflected from the target by way of the respective beam splitter cube. The two detectors are configured to detect motion between the first and second bodies in multiple degrees of freedom.

Yet another embodiment of the present invention is a system for detecting motion between a first body and a second body. The system includes a target having a groove transversing a length dimension of the target, wherein the groove is configured as a V along a cross-section dimension of the target, and the target is disposed on the first body; at least one detector-emitter pair disposed on the second body; the at least one emitter of the detector-emitter pair configured to transmit an optical beam toward the target; and the at least one detector configured to receive a portion of the optical beam reflected from the target. The one detector is configured to detect motion between the first and second bodies. Two emitters of two detector-emitter pairs are configured to each transmit a respective optical beam toward the target. Two detectors of the two detector-emitter pairs are configured to each receive a portion of the respective optical beam reflected from the target. The two detectors are configured to detect motion between the first and second bodies in multiple degrees of freedom. The target is configured to receive a first optical beam from one emitter and a second optical beam from the other emitter, and the target is configured to retro-reflect the first optical beam to one detector and retro-reflect the second optical beam to the other detector.

It is understood that the foregoing general description and the following detailed description are exemplary, but are not restrictive, of the invention.

BRIEF DESCRIPTION OF THE FIGURES

The invention is best understood from the following detailed description when read in connection with the accompany figures:

FIG. 1 is a functional block diagram showing an example of a system for measuring relative motion between body 1 and body 2.

FIGS. 2a and 2b depict a crossed beam roof target for receiving and reflecting optical beams, in accordance with an embodiment of the present invention.

FIG. 3 is another embodiment of a crossed beam roof target of the present invention.

FIGS. 6a, 6b, 6c and 6d depict the behavior of four return optical spots impinging upon two detectors, D1 and D2, when a crossed beam system experiences displacements in three dimensions.

FIGS. 7a, 7b, 7c, 7d and 7e depict the behavior of four return optical spots impinging upon two detectors, D1 and D2, when a crossed beam system experiences rotational movements in three dimensions.

FIG. 8 is a functional block diagram of a crossed beam system for sensing movement between two bodies in six degrees of freedom (DOF) as detected by detectors D1 and D2, in accordance with an embodiment of the present invention.

FIGS. 10a, 10b and 10c are detailed views of a crossed beam roof target, in accordance with an embodiment of the present invention.

DETAILED DESCRIPTION OF THE INVENTION

Figure 4A:
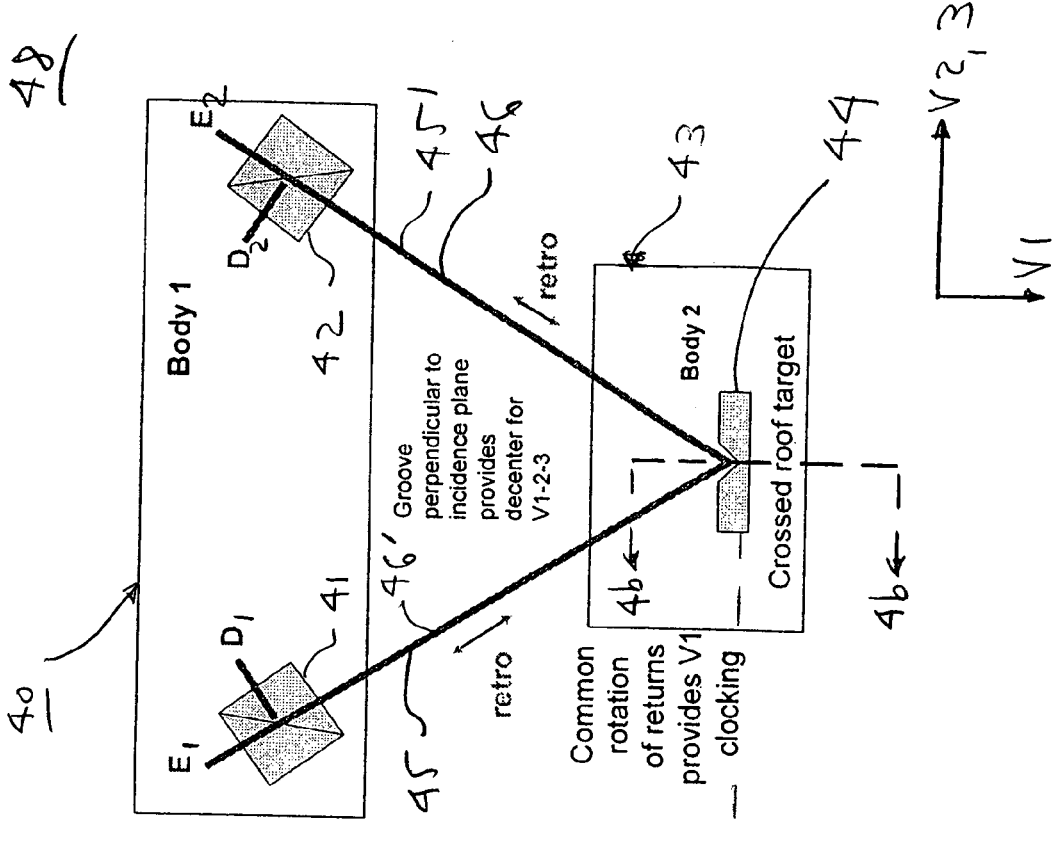
FIGS. 4a and 4b are sectional views of a crossed beam system including the crossed beam roof target shown in FIG. 2a, in accordance with an embodiment of the present invention.

As will be explained, the present invention provides a method and system for measuring displacement and orientation between a first body and a second body. The displacement may be measured with respect to three orthogonal axes (for example, an X, Y, Z coordinate system) and the orientation may be measured with respect to the same axes (for example, rotations about the X, Y and Z axes). The invention thus provides a user or a computer (for example) knowledge of motion with respect to six degrees of freedom (DOF).

The present invention advantageously measures relative motion between large or small bodies in a very confined space (or an open space). These bodies may be of any form or shape. For example, these bodies may be a large spacecraft docking with an orbiting module, or a small integrated chip being placed on a circuit board.

The present invention may measure displacements ranging from greater than a centimeter to less than a micron (root-sum-square of three translation directions) and may measure angular changes ranging from radians to nanoradians (root-sum-square of three rotation orientations). The present invention has an accuracy of better than 1:100 of the range of motion for each DOF.

Referring to FIG. 1, there is shown body 1 and body 2, respectively, designated as 10 and 15. Body 10 includes four beam splitter cubes, designated as 11, 12, 13 and 14. Body 15 includes two fiducial targets, designated as 16 and 18, and an optical flat, designated as 17. Each beam splitter cube is configured to receive an optical beam from an illumination source and transmit an optical beam to a detector. For example, beam splitter cube 11 receives optical beam 1 from emitter E1. Optical beam 1 is transmitted through beam splitter cube 11 to impinge upon fiducial target 16. The same beam is reflected back toward beam splitter cube 11 for detection by detector D1. Similarly, beam splitter cube 14 receives optical beam 4 from illumination source E4. Optical beam 4 is transmitted through beam splitter cube 14 toward fiducial target 18. Optical beam 4 is reflected back from fiducial target 18 towards beam splitter cube 14 for eventual detection by detector D4.

Furthermore, beam splitter cube 12 directs optical beam 2 from illumination source E2 toward optical flat 17. Optical beam 2 is reflected from optical flat 17 as reflected optical beam 2'. Optical beam 2' is detected by detector D3 associated with beam splitter cube 13. In a similar manner, beam splitter cube 13 receives optical beam 3 from illumination source E3 and transmits the optical beam towards optical flat 17. Optical beam 3 is reflected as optical beam 3' towards detector D2 associated with beam splitter cube 12.

As shown, bodies 10 and 15 and the components disposed on the bodies are oriented in the V1, V2 plane of a Cartesian orthogonal V1, V2, V3 coordinate system. Any displacement in the V2, V3 plane is detected by detectors D1 and D4. Rotation about the V1 axis is detected by a comparison between the signal outputted by detector D1 and the signal outputted by detector D4. Any displacement along the V1 axis is detected by differentially comparing the signal outputted by detector D2 and the signal outputted by detector D3. Any tilt in the V2, V3 plane is detected by a comparison between the signal outputted by detector D2 and the signal outputted by detector D3.

It will be understood that the illumination sources (or emitters) E1-E4 may be of any type emitter, such as a laser emitter. The detectors D1-D4 may be any type of centroid detector, such as duo lateral position sensing detector, or a pair of quadrant cells. In addition, it is not necessary to use the beam splitter cubes. Instead, the detectors and emitters may be used in pairs, such as detector-emitter pairs D1-E1, D2-E2, D3-E3 and D4-E4, without any beam splitter cubes. This may be accomplished by one skilled in the art by slightly offsetting a detector from an emitter in a detector-emitter pair.

In operation, the components placed on body 1, as shown in FIG. 1, are aligned or calibrated with respect to the components placed on body 2. For example, the location of optical beam 1 on fiducial target 16 is determined by centroid detector D1. Similarly, the location of optical beam 4 is located on fiducial target 18 by detector D4. Optical beams 2 and 3 are oriented to form 300 off-axis symmetric detection by detectors D2 and D3, forming a 60° angle between optical beams 2 and 3. It will be appreciated that the 60° angle formed between optical beams 2 and 3 are merely exemplary and other angles may also be used.

After calibration of the initial conditions of optical beams 1, 2, 3 and 4 are determined by detectors D1, D2, D3 and D4, respectively, the active components (E1, E2, E3, E4 and D1, D2, D3, D4) may be placed in operational use. Any displacement in the V1, V2 or V3 direction may be observed and measured by detectors D1, D2, D3 and D4. Any rotation about the V1, V2, or V3 axis may also be observed and measured by detectors D1, D2, D3 and D4.

The embodiment shown in FIG. 1 requires four illumination sources, four centroid detectors, two fiducial targets and one optical flat. This embodiment is complicated and tedious to setup, although it effectively provides 3 displacements and 3 rotations in a Cartesian coordinate system having axes V1, V2 and V3. Another embodiment of the present invention reduces the number of components required to be placed on two bodies to determine motion in 6 degrees of freedom. It does not use optical flat 17 placed on body 15 in FIG. 1. Instead, a target which is referred to herein as a crossed beam roof target is used.

Two exemplary embodiments of a crossed beam roof target are shown in FIGS. 2a, 2b and 3. As shown in FIG. 2a, crossed roof target 20 includes two orthogonally oriented beams 23 and 24 forming a crossed beam structure. Each beam is grooved on a top side configured to receive optical beams for reflection from an illumination source, as will be explained. Each groove is shaped as a V-notch. Thus, beam 23 includes V-notch 21 and beam 24 includes V-notch 22. As shown in FIG. 2b, V-notch 22 forms an apex angle of 90°±3°. Preferably, V-notch 22 has an apex angle of 90°±72 arc seconds. Similarly, V-notch 21 has an apex angle that is identical to that of the apex angle of V-notch 22. Moreover, both V-notches may be coated with a reflective surface for reflecting a received illumination beam toward a detector. As an example of dimensions for V-notch 21 or V-notch 22, the length (L) of the V-notch may be 20 millimeters and the top width (w) of the V-notch may be 5 millimeters.

FIG. 3 shows another example of a crossed beam roof target, generally designated as 30. Crossed beam roof target 30 includes cylindrical structure 33 having orthogonally oriented grooves forming V-notches 31 and 32 formed on the top side of cylindrical structure 33.

Figure 4B:
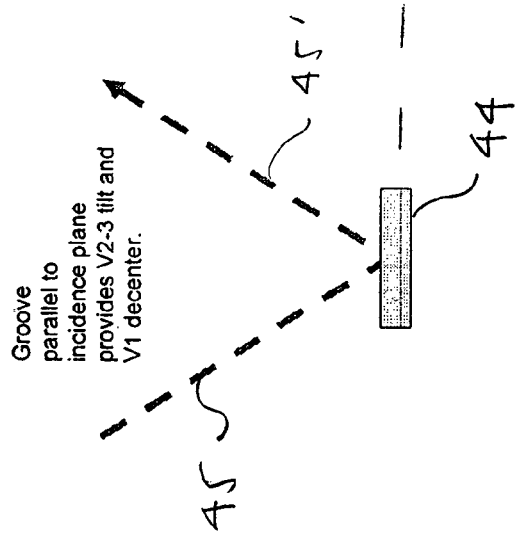

Referring next to FIGS. 4a and 4b, there is shown a crossed beam system, generally designated as 48. As shown, body 2, designated as 43, includes a crossed beam roof target, which is similar to crossed beam roof target 20 (shown in FIG. 2a). The crossed beam roof target 44 is disposed on body 2 and is oriented in the V1, V2 (or V1, V3) plane to receive optical beams 45 and 46 from two beam splitter cubes positioned on body 1.

Body 1, designated as 40, includes two beam splitter cubes, designated as 41 and 42. Each beam splitter cube is configured to receive an optical beam from an illumination source (or emitter) and transmit the optical beam to a detector. For example, beam splitter cube 41 receives optical beam 45 from emitter E1. Optical beam 45 is transmitted through beam splitter cube 41 and impinges upon crossed roof target 44. A portion of beam 45 is retro-reflected back toward beam splitter cube 41 and another portion of beam 45 is reflected toward beam splitter cube 42 (the reflected beam is designated as 45'. Accordingly, retro-reflected beam 45 is detected by detector D1 and the reflected portion of beam 45 (beam 45') is detected by detector D2. In a similar manner, retro-reflected beam 46 is detected by detector D2 and the portion of reflected beam 46 (beam 46') is detected by detector D1.

FIG. 4a shows crossed beam roof target 44 oriented with its V-notch (groove) perpendicular to the incidence plane of optical beams 45 and 46. FIG. 4b shows crossed beam roof target 44 oriented with its other V-notch (groove) parallel to the incidence plane of optical beams 45 and 45' (beams 46 and 46' are not shown).

Accordingly, each detector (D1, D2) sees two return optical beams. The reflected beam 45' from roof target 44, in an axis of symmetry parallel to the plane of incidence, reflects up into the opposing detector D2. The return beam (45, 46) from roof target 44, in an axis of symmetry perpendicular to the plane of incidence, retro-reflects up into the companion detector (D1 for beam 45 and D2 for beam 46) and reflects toward the opposing detector (D2 for beam 45' and D1 for beam 46'). Thus, two returns exist due to a commonly launched beam from a single emitter. Since there are two opposing emitters, the total number of return beams is four. There are two common beams and two opposing beams.

It will be appreciated that the embodiment shown in FIGS. 4a and 4b only require two illumination sources and two centroid detectors in body 1 and only a single crossed beam roof target in body 2. Although fewer components are used in crossed beam system 48, nevertheless, any displacement and any orientation in six degrees of freedom may be observed and measured.

The groove perpendicular to the incidence plane of optical beams 45 and 46 provides decentering information for the V1, V2, and V3 axes; and the groove parallel to the incidence plane of optical beams 45 and 46 provides V2, V3 tilt information and V1 decentering information. Common rotation of return beams 45 and 46 provides rotation information about the V1 axis.

The beam splitter cubes, optical illuminators (emitters) and detectors shown in crossed beam system 48 may be similar to the components used in the embodiment shown in FIG. 1.

The crossed beam roof target of the present invention provides unique properties. The two orthogonal grooves, or V-notches, provide two optical rotators. In other words, V-notch 21 (FIG. 2a) is one optical rotator and V-notch 22 is a second optical rotator. These rotators are displaced from each other by 90 degrees. The optical rotation properties of the crossed beam roof target are absent in the flat reflector (optical flat 17 of FIG. 1), or in a cube corner retro reflector (not shown). It will be appreciated, however, that other types of optical rotators may be used in lieu of the crossed beam roof targets shown in FIGS. 2 and 3. Examples of such optical rotators are dove prisms and afocal cylinder relays.

As shown in FIGS. 4a and 4b, two emitters (E1 and E2) are oriented to symmetrically triangulate optical beams on crossed beam roof target 44 in the V1, V2 plane (or in the V1, V3 plane). This symmetry, however, is not required.

In yet another embodiment, it may be desirable to split each return beam into a dual spot by making each V-notch have an imperfect apex angle (where 90 degrees is perfect). As one example, the apex angle of each V-notch may be increased by 72 arc seconds. This allows for an added degree of separation in the two return beams and thus provides an unambiguous signature differentiator in the two return beams. The return beams may also be separated by using perfect cross beam roof mirrors (90° apex angle) and biasing the emitters and detectors so that the retro returns and the opposing returns are offset. In addition, the signature of the return spots may be different for opposing returns and retro returns due to a difference in the projected aperture of the orthogonal roof mirrors, particularly when provided by diffraction limited coherent sources.

Figure 5:
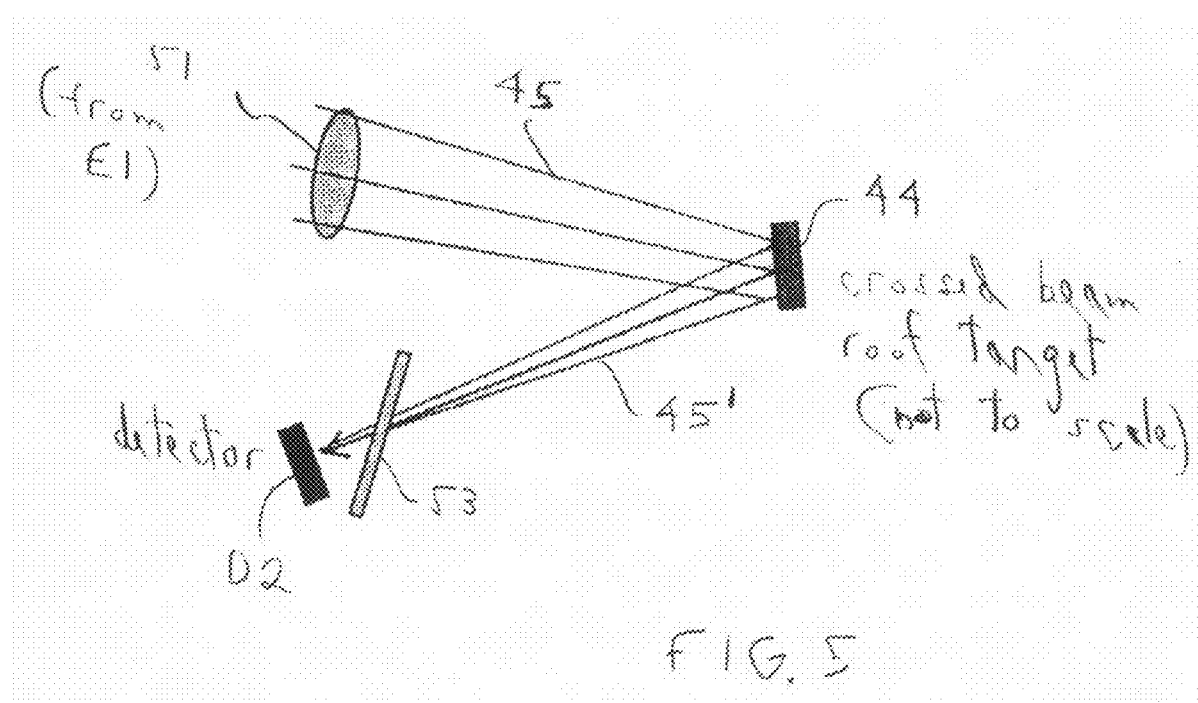
FIG. 5 is a sectional view of an optical beam emitted from an emitter, next reflected from a crossed beam roof target and, finally, impinged upon a detector, in accordance with an embodiment of the present invention.

As an example of a specific configuration for crossed beam system 48, shown in FIGS. 4a and 4b, the following example is provided. The crossed beam system 48, when simulated in a Zemax optical ray tracing program, has the following properties:

a) Crossed beam fiducials with 30 degree off-axis symmetric detection (60 degrees between optical beams 45 and 46).

b) Emitters E1 and E2 focused on detectors D1 and D2, respectively, with optical beams 45 and 46 reflecting and retro-reflecting from crossed beam roof target 44. This geometry is illustrated in FIG. 5 with only one optical beam (45) and one reflected optical beam (45') shown. The other optical beam 46 (not shown) is emitted from E2 toward target 44 and reflected as optical beam 46' toward detector D1.

c) The optical beam 45 has a 50 mm exit beam diameter measured at lens 51. Optical beam 46 (not shown) has a similar 50 mm exit beam diameter measured at its own focusing lens.

d) The diameters of optical beams 45 and 46 are cut in half at target 44 (25 mm diameter) by focusing lens 51 and the other lens (not shown).

e) Each V-notch of crossed beam roof target 44 has an apex angle of 90 degrees plus 72 arc seconds.

f) The distance from the emitters D1 and D2 to respective detectors E1 and E2 is 4.2 meters.

g) The detectors D1 and D2 are each an array of 128×128 pixels (12 mm×12 mm detectors).

h) In the simulation, each optical ray 45 and 46 has 10,000 line rays per illumination source.

i) Target 44 is a cross with a V-notch of 20 mm length (L) and a width (w) of 5 mm, at the top of the V-notch.

For the above example, each of the spots formed on the detectors are split, as four spots, or as 2 pairs of spots, as shown in FIGS. 6a and 7a. Each of the spots is diffraction limited to a full width half maximum (FWHM) of approximately 0.6 times the wavelength (λ) divided by the numerical aperture. In the aforementioned example, the numerical aperture is the length (L) of the crossed beam roof mirror (target) divided by two times the working distance (WD), and half of the width (w) of the crossed beam roof mirror (target) divided by two times the working distance for the short and long axis of the spot, respectively. This may be solved as follows:

$$FWHM_{short} \approx 1.2\lambda \frac{WD}{L}$$

$$FWHM_{long} \approx 2.4\lambda \frac{WD}{w}$$

Continuing description of the above example, with a 633 nm wavelength (λ), the short FWHM is 160 um and the long FWHM is 1.3 mm. The simulation was not conducted using diffraction effects, but the spot sizes shown in FIGS. 6a and 7a are reasonable for the application. Also for the other related FIGS. 6b-6d and 7b-7e, the simulated results are shown overlaid with large graphic spot markers for purpose of clarity.

Referring now to FIGS. 6b-6d and FIGS. 7b-7d, the behavior of the return spots are shown for individual DOF perturbations. Each figure shows a series of four spot returns for each of the two detectors D1 and D2. On each detector, the pair of spots that is vertically aligned is due to the common emitter (retro reflect) and the pair of spots that is horizontally aligned is due to the opposing emitter.

In all cases, the system is calibrated with the baseline detector images and then the subsequent images are compared to the baseline images. This may be accomplished with an imaging (pixilated) detector. A combination of quad cells or lateral effect detectors (for example) may also be used.

The responses of the two detectors (D1 and D2) are summarized below. All the responses below and in the corresponding figures are with respect to motion about the center of the target (cross beam roof target), where the detectors and emitters are stationary. The spot pairs always move in unison.

dx: displacement perpendicular to the plane of incidence causes the opposing beams to be displaced horizontally, but does not alter the retro beam (FIG. 6b).

dy: displacement parallel to the plane of incidence causes the retro beams to be displaced vertically, but does not alter the opposing beam position (FIG. 6c).

dz: displacement along the axis of symmetry causes the entire beam pattern to shift vertically in unison with opposite directions for opposing detectors (FIG. 6d).

Rotation about x: rotation about an axis perpendicular to the plane of incidence causes the opposing beams to be displaced vertically, but does not alter the retro beam position (FIG. 7b).

Rotation about y: rotation about an axis parallel to the plane of incidence causes the retro beams to be displaced horizontally, but does not alter the opposing beam position (FIG. 7c).

Rotation about z: rotation about the axis of symmetry causes the entire beam pattern to shift horizontally in unison with opposite directions for opposing detectors (FIG. 7d).

Closer inspection shows that this motion follows a large arc given by the geometry of the setup. For small displacements, the behavior is approximately linear (tangent to the arc).

FIG. 7e shows displacements and rotations as combinations of all of the above.

Thus, the perturbation responses of the two detectors (D1 and D2) provide a pair of unambiguous and separable orthogonal "bow" patterns. The present invention may, therefore, analyze a vertical (V) shift or a horizontal (H) shift is of each "bow" to determine any motion between two bodies.

The following table 1 provides the quantitative results of the behavior of the return spots shown in FIGS. 6a-6d and 7a-7e. The two detectors are assumed to be in a system having crossed fiducial targets with 30 degrees off-axis symmetric detection. Table 2 shows that response matrix of the system and table 3 shows the inverse response matrix.

TABLE 1

| Crossed fiducials with 30° off-axis symmetric detectiocn | | | | | | |
|---|---|---|---|---|---|---|
| Perturbations | | | | milli rad | | |
| x mm | y mm | z mm | theta about x | theta about y | theta about z | 1 Pixel Accuracy |
| — | — | — | — | — | — | [mm or milliard] |
| 1 | — | — | — | — | — | 0.0100 |
| — | 1 | — | — | — | — | 0.0125 |
| — | — | 1 | — | — | — | 0.02 |
| — | — | — | 0.2 | — | — | 0.0024 |
| — | — | — | — | 0.2 | — | 0.0027 |
| — | — | — | — | — | 0.2 | 0.004 |

TABLE 2

Response Matrix
Image impact - Shift in millimeters

| D1 H bow H shift | D1 H bow V shift | D1 V bow H shift | D1 V bow V shift | D2 H bow H shift | D2 H bow V shift | D2 V bow H shift | D2 V bow V shift |
|---|---|---|---|---|---|---|---|
| 2 | — | — | — | 2 | — | — | — |
| — | — | — | 1.6 | — | — | — | 1.6 |
| — | 1 | — | 1 | — | -1 | — | -1 |
| — | 1.65 | — | — | — | 1.65 | — | — |
| — | — | -1.5 | — | — | — | -1.5 | — |
| -0.9 | — | -0.9 | — | 0.9 | — | 0.9 | — |

TABLE 3

Inverse Response Matrix

| | | | | | |
|---|---|---|---|---|---|
| 0.25 | 0.00 | 0.00 | 0.00 | 0.00 | -0.28 |
| 0.00 | 0.00 | 0.25 | 0.30 | 0.00 | 0.00 |
| 0.00 | 0.00 | 0.00 | 0.00 | -0.33 | -0.28 |
| 0.00 | 0.31 | 0.25 | 0.00 | 0.00 | 0.00 |
| 0.25 | 0.00 | 0.00 | 0.00 | 0.00 | 0.28 |
| 0.00 | 0.00 | -0.25 | 0.30 | 0.00 | 0.00 |
| 0.00 | 0.00 | 0.00 | 0.00 | -0.33 | 0.28 |
| 0.00 | 0.31 | -0.25 | 0.00 | 0.00 | 0.00 |

If a crossed beam system is configured without the split spot return (roof mirror deviation) the direction of motion of the respective returns is the same as in the example above.

A functional illustration of a signal path (analog or digital) for independent sensing of each Cartesian DOF is shown in FIG. 8. As shown, the retro and opposing returns are assumed to be spatially separated at each detector. The D1 and D2 detectors are each a pair of quadrant cells or duo lateral position sensing detectors. The system, designated as 80, may perform real time monitoring of all DOFs.

As shown in FIG. 8, the D1 detector has four signal outputs, namely retro-horizontal 1 (RH1), retro-vertical 1 (RV1), opposing-horizontal 1 (OH1) and opposing-vertical 1 (OV1). Similarly, the D2 detector has four signal outputs, as RH2, RV2, OH2 and OV2.

The signals OV1, OH2, RV1, RV2, etc. are added or subtracted as shown at the respective intersecting points (+ or −).

The following equations may be used to represent the output displacements (dx, dy, dz) and the output rotations ($\theta x$, $\theta y$, $\theta z$) of the signals shown in FIG. 8. The signals OV1, OH2, RV1, RV2, etc. are proportional to displacement of the spots on each of the detectors from their initial positions. The six DOF signals are given by:

$$dx = k_x[OV1+OV2]$$

$$dy = k_y[RV1+RV2]$$

$$dz = k_z[OV1+RV1-OV2-RV2]$$

$$\theta_x = k_{\theta x}[OH1+OH2]$$

$$\theta_y = k_{\theta y}[RH1+RH2]$$

$$\theta_z = k_{\theta z}[OH1+RH1-OH2-RH2]$$

where dx, dy and dz are the displacements and $\theta_x$, $\theta_y$, and $\theta_z$ are the rotations.

Constants of proportionality for each DOF are given in each equation as k with a corresponding subscript. These constants may be determined analytically using the known geometry of the sensors and target and appropriate trigonometric equations. They may also be determined by numerical analysis of a solid model of the sensor and target, or numerical analysis of known perturbations of the as-built system configuration. In any case, standard linear algebra techniques, such as matrix inversion, may be employed to analyze the sensitivities used to determine the k's of the above equations. If the range of angles and/or displacements is sufficiently large, then non linear analysis may also be employed.

Figure 9:
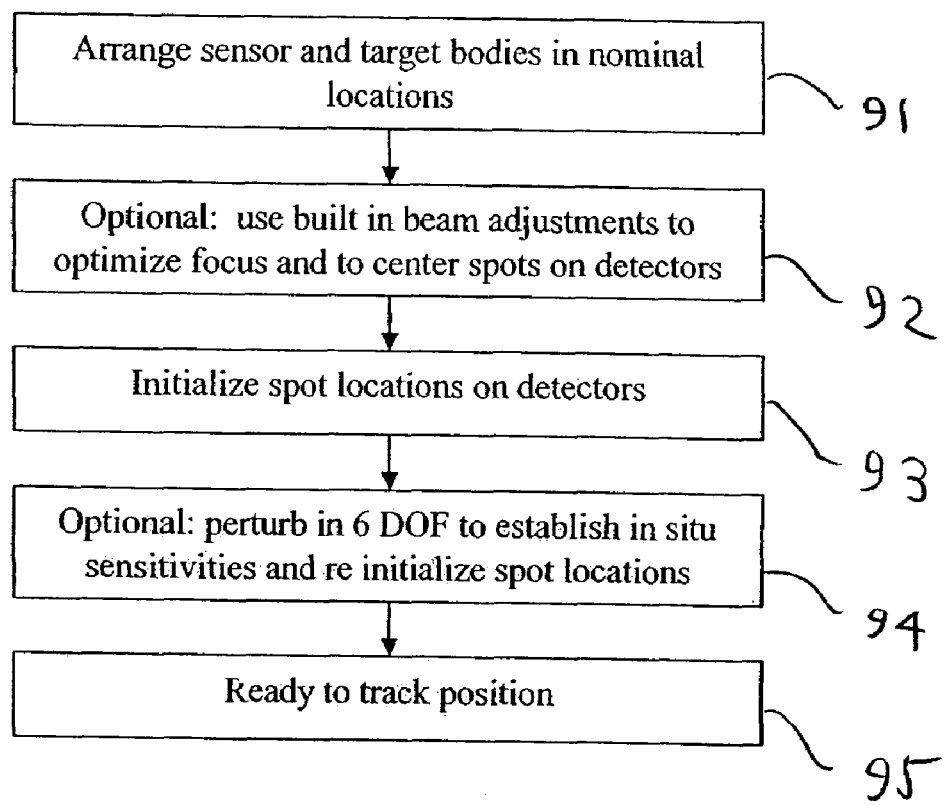
FIG. 9 is a functional flow diagram of a method for initializing the crossed beam system of FIG. 4, in accordance with an embodiment of the present invention.

A flow diagram for setting up the crossed beam system is shown in FIG. 9. As shown, initialization method 90 includes step 91 of arranging the sensor and target bodies in convenient locations and step 93 of recording the spot locations on the detectors. The system is then ready for tracking position (step 95). Steps 92 and 94 are optional.

Thus, initialization is as simple as recording the locations of each spot. For an analog electrical sensor system initialization may also include adjusting a bias voltage for each DOF output.

Lastly, FIG. 10a is a perspective view of an exemplary cross beam roof target, designated generally as 100. Examples of dimensions for the V-notches of cross beam roof target 100 are shown in FIG. 10b (top view) and FIG. 10c (side view). As also shown in FIG. 10a, the surfaces of the V-notches include a 5 nm Ra coating.

The present invention is applicable to a wide variety of applications. These include ambient to cryogenic drift tracking of hardware modules during test set cool down. In addition, two tracking systems may be located on a focal plane interferometer and used to track the location of two other rigid bodies relative to the focal plane interferometer. In general, the invention may include any number of bodies and/or multiple locations on one or more bodies. Furthermore, tracking of a multi degree of freedom optical storage pick up and active control systems are also potential applications.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for detecting motion between a first body and a second body comprising
    first and second detector-emitter pairs, disposed on the first body, configured to transmit and receive first and second optical beams, respectively,
    at least a first optical rotator, disposed on the second body, configured to receive and reflect at least one of the first and second optical beams, and first and second detectors of the first and second detector-emitter pairs configured to detect the first and second optical beams, respectively, wherein each of the first and second detectors is configured to detect motion between the first and second bodies in multiple degrees of freedom (DOFs), and the first optical rotator includes a V-notch oriented to form an apex of an isosceles triangle with respect to a base of the isosceles triangle formed by the first and second detector-emitter pairs.

2. The system of claim 1 further comprising
first and second emitters of the first and second detector-emitter pairs configured to transmit the first and second optical beams toward the at least first optical rotator.

3. The system of claim 1 wherein
the V-notch is configured to receive the first optical beam from the first emitter and reflect the first optical beam to both the first and second detectors, and the V-notch is configured to receive the second optical beam from the second emitter and reflect the second optical beam to both the first and second detectors.

4. The system of claim 1 wherein
the V-notch forms an angle of 90 degrees + or −3 degrees.

5. The system of claim 2 wherein
the first optical beam is configured to traverse a path from the first emitter to the first optical rotator, and then to the second detector, the first optical beam includes a first beam diameter at the first emitter and a second beam diameter at the second detector, and the first beam diameter is twice the size of the second beam diameter.

6. The system of claim 1 further comprising
a second optical rotator, disposed on the second body, wherein the first and second optical rotators form first and second V-notches, respectively, which are transversely oriented to each other and form a crossed beam target.

7. The system of claim 6 wherein
a length of the first V-notch is oriented perpendicular to an incidence plane of the first and second optical beams and a length of the second V-notch is oriented parallel to the first and second optical beams.

8. The system of claim 7 including a three dimensional orthogonal V1, V2 and V3 axes, wherein
the lengths of the first and second V-notches are oriented in the V2, V3 plane, and a triangle formed between the first and second detectors and the crossed beam target is oriented in the V1 plane, wherein the first V-notch is effective in providing decentering information for the V1, V2, V3 axes, the second V-notch is effective in providing decentering information for the V1 axis and tilt information for the V2, V3 plane.

9. A system for detecting motion between a first body and a second body comprising
a target having two orthogonally oriented grooves crossing each other, wherein each groove is configured as a V along a cross-section of the target, and the target is disposed on the first body, at least one beam splitter cube disposed on the second body, at least one emitter configured to transmit an optical beam toward the target by way of the one beam splitter cube, and at least one detector configured to receive a portion of the optical beam reflected from the target by way of the one beam splitter cube, wherein the one detector is configured to detect motion between the first and second bodies, the target includes a cylindrical structure, and the two orthogonally oriented grooves are disposed at an end surface of the cylindrical structure.

10. The system of claim 9 wherein
the target includes two orthogonally oriented beams crossing each other, and each beam includes one of the two orthogonally oriented grooves.

11. The system of claim 9 wherein
two beam splitter cubes are disposed on the second body, two emitters are configured to each transmit a respective optical beam toward the target by way of a respective beam splitter cube, two detectors are configured to each receive a portion of the respective optical beam reflected from the target by way of the respective beam splitter cube, and the two detectors are configured to detect motion between the first and second bodies in multiple degrees of freedom.

12. The system of claim 9 wherein
the V forms an apex of approximately 90 degrees.

13. A system for detecting motion between a first body and a second body comprising
a target having a groove transversing a length dimension of the target, wherein the groove is configured as a V along a cross-section dimension of the target, and the target is disposed on the first body, at least one emitter, disposed on the second body, configured to transmit an optical beam toward the target, and at least one detector, disposed on the second body, configured to receive a portion of the optical beam reflected from the target, wherein the one detector is configured to detect motion between the first and second bodies, the groove is oriented to form an apex of a triangle with respect to a base of the triangle formed by the at least one emitter and the at least one detector.

14. The system of claim 13 wherein
two emitters are disposed on the second body and configured to each transmit a respective optical beam toward the target, two detectors are disposed on the second body and configured to each receive a portion of the respective optical beam reflected from the target, and the two detectors are configured to detect motion between the first and second bodies in multiple degrees of freedom.

15. The system of claim 13 wherein
the V forms an apex of approximately 90 degrees.

16. The system of claim 13 wherein
the target is configured to receive a first optical beam from one emitter and a second optical beam from the other emitter, and the target is configured to retro-reflect the first optical beam to one detector and retro-reflect the second optical beam to the other detector.

17. The system of claim 13 wherein
the one emitter has an exit diameter, and the target is configured to divide by two the exit diameter of the optical beam for focusing the optical beam on the one detector.

* * * * *